United States Patent Office 3,532,460
Patented Oct. 6, 1970

3,532,460
PURIFICATION OF ALUMINA
Harry C. Snyder, Belleville, Ill., assignor to Aluminum Company of America, Pittsburgh, Pa., a corporation of Pennsylvania
No Drawing. Filed Mar. 21, 1968, Ser. No. 714,787
Int. Cl. C01f 7/46
U.S. Cl. 23—142     9 Claims

ABSTRACT OF THE DISCLOSURE

Alumina, contaminated with the oxides of gallium, iron, sodium, calcium and other metals can be purified by contacting with chlorine gas at an elevated temperature provided that the alumina is in a partially calcined state such that its total water content varies from 2 to 6%. All of the above-named oxides are converted to chlorides, some of which are volatilized in the initial treatment and removed as gas whereas others remain with the alumina and can be removed by other treatments.

---

This invention relates to the purification of alumina and more particularly to the removal of the oxides of gallium, iron, sodium, calcium and other metals. It is especially suited to removing gallium and sodium oxides.

BACKGROUND OF THE INVENTION

Alumina, as is known, is useful in the production of aluminum together with other direct applications in ceramics, refractories, thermal and electrical insulation and other industries. Some applications require that the alumina contain a minimum of contaminants, the most common contaminants being metal oxides such as those of gallium, iron, sodium, calcium and others. It is sometimes desired to provide alumina containing less than 0.006% gallium oxide and less than 0.003% iron oxide. It is also sometimes desirable to provide alumina containing less than 0.35% sodium oxide, especially for certain ceramic applications.

Statement of the invention

In accordance with the present invention, metal oxide impurities, especially those of gallium, iron, zinc, calcium, manganese, copper and sodium, can be removed or effectively reduced by contacting the alumina with chlorine gas at an elevated temperature of from 800° to 1000° C. It is important that the alumina be in a condition such that it contains a total water (T.W.) content of by weight, 2 to 6%. This corresponds to a specific surface area of 40 to 120 square meters per gram of alumina. Partial calcining is advantageously employed for this purpose. It is also important that the chlorine contact be effected with substantially no air or gaseous oxygen present. In the reaction zone the metal oxides are converted to the corresponding chlorides which can then be removed with relative ease. For instance, the gallium and iron chlorides are volatilized and can be removed at the chlorination site as gases. The sodium and calcium chlorides remain with the alumina but are easily removed by washing or calcining. Since gallium is a valuable material for use in semiconductor applications, it may be recovered by known methods if desired.

Detailed description

The improved method contemplates the use of elemental chlorine gas although the chlorine gas can be provided as a component in a gas mixture. For instance, a gas containing equal parts chlorine and nitrogen may be employed. It should be noted, though, that the carrier gas should not contain any significant amount of oxygen since oxygen seriously hinders the reaction. The chlorine employed can be of commercial purity without further costly purification.

The alumina particle size is not critical in practicing the invention. However, it is essential that the alumina be properly calcined as provided herein or somehow imparted with the herein prescribed characteristics with respect to total water and surface area in order to achieve the advantages of the invention. If the alumina is completely calcined, or in the so-called hard burned condition, it will not respond properly to the chlorination as is also the case where the alumina is not sufficiently calcined. The degree of calcining or other treatment is such that the total water, T.W., content of the alumina ranges from 2 to 6% which corresponds to a specific surface area of 40 to 120 square meters per gram. It is preferred that the T.W. range from 3 to 5% which corresponds to a specific surface area of 80 to 100 m.$^2$/g. The calcining temperature should not normally exceed 1100° C. although it is preferable that the alumina be calcined at some temperature above that contemplated in the chlorination step so as to prevent any further calcining from occurring during the chlorination. A thirty minute calcining at 1100° C. typically results in a T.W. content of only 1.6%. Also, typically, thirty minutes at 1000° C. provides a T.W. content of 3% and 2 hours at 800° C. provides a 5% T.W. content. The total water content of a sample of alumina is determined by exposing the sample to air having a 44% relative humidity for a sufficient time to assure sorption equilibrium. The water driven off in a subsequent complete calcining is measured and constitutes the total water. The surface area may be measured by a Perkin-Elmer Shell Sorptometer. As indicated above, particle size of the alumina is not important since, in the partially calcined state, the surface area is far more a function of internal pore area than particle size. For instance, a suitable particle size might be such that 80% falls within −100 +325 mesh size, in the Tyler standard sieve series, with the balance of the particles equally divided between smaller and larger sizes. However, such certainly is no limit on the practice of the invention which contemplates alumina of any particle size having the correct T.W. content or specific surface area.

The chlorination can be effected by any means of passing a chlorine stream over or around the alumina particles in such a way as to contact the individual particles. For instance, a rotating kiln or even a static bed is satisfactory although a fluidized bed is often more desirable. The chlorination temperature ranges from 800 to 1000° C. although 850° to 950° C. is preferred. Above 1000° C. a serious risk of an undesirable phase change in the alumina is encountered whereas below 800° C. the reaction rate appears to be seriously retarded. It is also preferred that the chlorination temperature not exceed the temperature at which the alumina had been calcined. The reason is that higher chlorinating temperatures can result in additional calcining which might alter the T.W. content of the alumina outside the required 2 to 6% making process control a serious problem.

The time required for the reaction varies from case to case depending on a number of factors although it generally falls within the range of 5 to 100 minutes. Where, for instance, it is desired only to remove sodium without regard for gallium or ferrous oxides, a chlorination time of only one minute is generally sufficient to react all the sodium. On the other hand, the gallium and iron reactions sometimes require considerably more time although even one minute results in a considerable amount of the gallium being reacted. The required time in such a case depends upon the initial content and the desired purity level, the larger this difference, the longer the time required. Referring to Table I, the results of an 850° C.

chlorination, reacting pure chlorine with alumina having an initial T.W. content of 4% are listed with respect to the gallium oxide content. The alumina had been calcined at a temperature of 950° C.

TABLE I

| Time, minutes | $Ga_2O_3$ content (percent) |
|---|---|
| 0 | 0.018 |
| 5 | 0.015 |
| 10 | 0.011 |
| 15 | 0.006 |
| 18 | 0.005 |
| 20 | <0.005 |
| 30 | <0.0035 |

In general, it will be found that 5 to 25 minutes is sufficient although it is worth repeating that the time should be determined for a particular initial and desired final gallia content at the particular temperature involved.

As indicated earlier, it is desired that the chlorination be effected without any significant amount of air or oxygen present since such seriously hinders the reaction although some oxygen may be produced as a reaction product. Hence, the expression "substantially oxygen-free atmosphere" in the claims is intended to preclude the introduction to the chlorination site of any significant amount of oxygen which would seriously hinder the reaction, but tolerate that relatively small amount which may be produced as a reaction product. The chlorination produces no apparent phase change in the alumina which appears to be gamma phase material both before and after the chlorination.

The chlorination is advantageously effected in a fluidized bed and a reasonable free gas velocity would typically be in the neighborhood of 0.2 feet per second. This level is conveniently achieved and provides a rather significant degree of fluidization. Higher or lower velocities are operative and the choice of gas velocity will vary from case to case depending on the particle size, the composition of the gas (i.e. whether pure chlorine or a mixture of chlorine and nitrogen, etc.) and other factors known to influence fluidized bed gas rates. In this connection it is worth noting that it is sometimes advisable to use a mixture of chlorine and carrier gas to facilitate a desired fluidization while minimizing chlorine usage.

Subject to the qualifications mentioned above in connection with time, many of the impurity metal oxides are converted to their respective chlorides in the chlorination step. Some of the chlorides, for instance iron and gallium, are at least partially volatilized and removed with the exit gas. Others, for instance sodium, calcium and manganese, are not volatilized and remain with the alumina as soluble chlorides. These are easily removed by procedures described hereinafter. Another constituent in the exit alumina is a significant amount of chlorine, generally around 1% or a little higher. Some of this chlorine is apparently tightly sorbed but can be driven off by heating the alumina to 1000° C. or higher.

The gallium can be recovered from the chlorination gas exit stream by scrubbing this stream with water. The scrubbed gas stream can be wasted, although the limited solubility of chlorine may make drying, compressing and recycling the gas more economical. Another alternative is to neutralize the gas to produce useful by-products such as sodium hypochlorite (NaOCl).

The gallium may be recovered from the scrubbing liquid using known procedures. For instance, the addition of ammonia, or preferably ammonium hydroxide, converts the chlorides of gallium, titanium, etc., to their respective oxides which then precipitate and may be removed by filtering. The precipitate is then washed with water to remove soluble compounds such as chlorides and then leached in caustic (NaOH) which dissolves most of the constituents except iron. The addition of sodium sulfide to this solution causes the heavier constituents, such as lead or tin, to precipitate. The remaining liquid is employed as an electrolyte for the electrolytic plating of gallium which is recovered in a fairly pure state but may be further purified by other known methods. As indicated above, the procedure for recovering gallium does not form a part of this invention but rather may be used in conjunction with the improved process to realize further benefits in recovering a useful gallium by-product.

The alumina exiting the chlorination site, as indicated earlier, contains the chlorides of the metal oxides reacted but not volatilized at this site. Typical are the sodium and calcium chlorides which are carried with the chlorinated alumina. The alumina also contains an appreciable amount of sorbed chlorine. There are several treatments which can be performed at this stage to lower the amount of calcium, sodium or other metal oxide derivatives. One treatment is to calcine the alumina at a temperature of about 1100° C. for about 2 hours. This will lower the sodium content, calculated as $Na_2O$, by about 50%. Also reduced appreciably is the residual chlorine content although the calcium content remains substantially the same. In general, the calcining can be carried out at temperatures of 1000° to 1150° C. although a temperature of about 1100° C. is often desired. Time will vary from case to case although two hours is generally sufficient especially where a temperature of 1100° C. is employed.

Another treatment is to leach the alumina with a wash containing water and a small amount of acid although a water wash alone is generally quite effective. The washed and dried alumina generally contains about 70% less sodium and about 50 to 70% less calcium together with a considerable reduction in the chlorine content. From the standpoint of metal oxide impurity removal, there is little point in ordinary calcining of the leached product which generally exhibits the same sodium and calcium content as would the calcined product. However, the chlorine and moisture content of the leached product can be reduced by calcining.

The effect of calcining can be considerably increased by the presence of a relatively small amount of a fluorine containing mineralization additive which promotes the growth of the alumina crystal structure to further purify the alumina. Hydrogen fluoride and metal fluoride salts such as sodium, calcium or aluminum fluoride perform this function quite satisfactorily. For instance, the soda content of either leached or unleached alumina can be reduced 50 or 60% or even more by calcining with fluoride which, by the way, contemplates the same time and temperatures as for ordinary calcining described above. One very effective way of providing the fluoride is to simply add about 0.3 to 1% $AlF_3$ based on the weight of the $Al_2O_3$ before calcining. For instance, the addition of 0.5% $AlF_3$ has proved very effective.

TABLE II

| Example | Treatment[a,b] | Analyses wt. (percent[c,d]) | | | | | | | | |
|---|---|---|---|---|---|---|---|---|---|---|
| | | $Ga_2O_3$ | $Fe_2O_3$ | $Na_2O$ | CaO | MnO | ZnO | CuO | TW | $Cl_2$ |
| 1 | {1,000° C. in fluid bed, 30 min.[a] | [c]0.009 | [c]0.010 | [c]0.47 | [c]0.034 | [c]0.0013 | [c]0.006 | [c]0.003 | [c]3.28 | |
| | {Pure $Cl_2$ at 850° C. 30 min.[b] | [d]0.003 | [d]0.003 | [d]0.43 | [d]0.034 | [d]0.0010 | [d]<0.0005 | [d]0.0007 | | [d]1.15 |
| 2 | {800° C. in fluid bed, 30 min.[a] | [c]0.017 | [c]0.041 | [c]0.44 | [c]0.033 | [c]0.0008 | [c]0.003 | [c]<0.0005 | [c]5.99 | |
| | {50% $Cl_2$, 50% $N_2$ at 900° C.[b] | [d]0.002 | [d]0.013 | [d]0.46 | [d]0.031 | [d]0.0008 | [d]<0.0005 | [d]<0.0005 | | [d]1.65 |
| 3 | {1,000° C. in fluid bed, 30 min.[a] | [c]0.017 | [c]0.041 | [c]0.44 | [c]0.033 | [c]0.0008 | [c]0.003 | [c]<0.0005 | [c]3.16 | |
| | {50% $Cl_2$, 50% $N_2$ at 900° C., 15 min.[b] | [d]0.005 | [d]0.012 | [d]0.48 | [d]0.034 | [d]0.0005 | [d]<0.0005 | [d]<0.0005 | | [d]1.03 |
| 4 | {1,100° C. in fluid bed, 30 min.[a] | [c]0.017 | [c]0.041 | [c]0.44 | [c]0.033 | [c]0.0008 | [c]0.003 | [c]<0.0005 | [c]1.67 | |
| | {50% $Cl_2$, 50% $N_2$ at 900° C., 15 min.[b] | [d]0.008 | [d]0.025 | [d]0.32 | [d]0.031 | [d]0.0008 | [d]<0.0005 | [d]<0.0005 | | [d]0.55 |

[a] Calcination.
[b] Chlorination.
[c] Before chlorination.
[d] After chlorination.

Illustrative examples

Several samples of alumina were calcined under different conditions to provide varying total water contents, and then chlorinated under varying conditions to determine the effect of the chlorination. The results are shown in Table II where it is apparent that the $Fe_2O_3$, $Ga_2O_3$, MnO, ZnO and CuO contents are very appreciably reduced in the chlorination although the sodium and calcium contents, calculated as oxides, are not appreciably altered. Also, the chlorination of alumina containing less than 2% T.W. did not reduce the gallium oxide content to 0.005, or less, which is so often desired in alumina intended for electrolytic reduction to produce aluminum. Another chlorination, carried out in the presence of air, failed to show any significant reaction.

Turning now to the effects of the various secondary treatments of the chlorinated alumina as provided herein, reference should be made to Table III where the chlorinated $Al_2O_3$ is subjected to five different treatments.

TABLE III.—SECONDARY TREATMENT

| Example | Treatment | Analyses, percent | | | | | | |
|---|---|---|---|---|---|---|---|---|
| | | $Fe_2O_3$ | $Na_2O$ | CaO | $Ga_2O_3$ | MnO | $Cl_2$ | TW |
| | Initial chlorinated $Al_2O_3$ | .016 | .42 | .033 | .003 | .0009 | 1.25 | |
| 5 | Calcined 2 hr. at 1,100° C | .013 | .20 | .032 | .003 | <.0005 | .02 | .64 |
| 6 | Calcined 2 hr. at 1,100° C. with 0.5% $AlF_3$ | .015 | .077 | .036 | .004 | <.0005 | .02 | .02 |
| 7 | Leached in $H_2O$, dried | .013 | .13 | .012 | .003 | <.0005 | .34 | 3.49 |
| 8 | Water-leached and calc. 2 hr. at 1,100° C | .016 | .14 | .011 | .004 | .0006 | .03 | .51 |
| 9 | Water-leached and calc. 2 hr. at 1,100° C. with 0.5% $AlF_3$ | .015 | .032 | .016 | .003 | .0006 | .02 | .12 |

In the table it is clear that calcining, with or without fluoride, practically eliminates all the chlorine content in the alumina. The iron and gallium contents at this stage are not affected. The sodium content, as soda, is decreased considerably by calcining although calcining with fluoride is even more effective. Calcination exerts practically no effect on the calcium oxide content. Leaching in water decreases the sodium content more than calcining without fluoride but less than the case where the alumina is calcined with fluoride. It is not surprising then that the water-leached product shows no difference in soda content when calcined without fluoride. However, when the water-leached product is calcined with fluoride, the soda content reaches the lowest level. In Table III it is seen that any of the secondary treatments decreases the manganese oxide content, though, because of the small amount present to start with, these results are not as meaningful as those with sodium and calcium oxides.

From the foregoing description and examples, it becomes immediately apparent that the improved process is a highly effective means of purifying alumina. The primary process, the chlorination, can be employed to remove, as volatiles, gallium, iron, copper, zinc, and to some extent, manganese oxides in the form of volatile chlorides which are removed in the chlorination process with the gas effluent.

Some impurities, notably $Na_2O$ and CaO, are reacted but not volatilized to any appreciable extent during chlorination. To remove a considerable proportion of these impurities as well as most of the residual chlorine, the aforementioned secondary treatments can be employed individually or in combination. For instance, the water leach followed by calcining with fluoride will produce the lowest possible soda content along with minimizing calcium oxide.

What is claimed is:

1. The method of treating alumina contaminated with an oxide of at least one metal selected from the group consisting of gallium, iron, zinc, calcium, manganese, copper and sodium comprising
   (1) providing said alumina in a partially calcined condition such that it has a surface area of 40 to 120 square meters per gram and a total water content of 2 to 6%,
   (2) contacting said alumina while in said partially calcined condition with chlorine gas at a temperature of 800° to 1000° C. and in a substantially oxygen-free atmosphere for a period of time sufficient to react the metal oxide contaminant to form the corresponding metal chloride.

2. The method according to claim 1 wherein the alumina is contacted with the chlorine gas at a temperature of 850° to 950° C.

3. The method according to claim 1 wherein the alumina has a surface area of 80 to 100 square meters per gram and a total water content of 3 to 5%.

4. The method according to claim 1 wherein the chlorine and alumina are contacted in a fluidized bed.

5. The method according to claim 1 wherein the alumina is contaminated with gallium oxide and is contacted with chlorine for a period of time within the range of 5 to 100 minutes, the time being of sufficient duration to react and volatilize a sufficient quantity of gallium oxide contaminate as to reduce the residual gallium content of the alumina, calculated as gallium oxide, to not more than 0.005%.

6. The method according to claim 1 wherein the chlorinated alumina is calcined at a temperature of 1000° to 1150° C.

7. The method according to claim 6 wherein the chlorinated alumina is calcined in the presence of at least one fluorine-containing compound selected from the group consisting of hydrogen fluoride and metal fluoride salts.

8. The method according to claim 1 wherein the alumina is contaminated with sodium oxide and wherein the chlorinated alumina is leached by washing with a liquid comprising water.

9. The method of treating alumina contaminated with an oxide if at least one metal selected from the group consisting of gallium, iron, zinc, calcium, manganese, copper and sodium comprising:
   (1) calcining said alumina at a temperature of 800° to 1100° C. to produce a partially calcined alumina having a surface area of 40 to 120 square meters per gram and a total water content of 2 to 6%,
   (2) contacting said partially calcined alumina with chlorine gas and at a temperature of 800° to 1000° C., but not higher than the temperature at which the alumina was partially calcined, in a substantially oxygen-free atmosphere for a period of time sufficient to react the metal oxide contaminate to form the corresponding metal chloride.
   (3) separating at least a portion of said metal chloride from said alumina.

References Cited

UNITED STATES PATENTS

| | | | |
|---|---|---|---|
| 2,030,868 | 2/1936 | Hart | 23—87 X |
| 2,823,096 | 2/1958 | Frevel et al. | 23—87 X |
| 2,961,297 | 11/1960 | Fenerty | 23—142 |
| 3,175,883 | 3/1965 | Lindsay et al. | 23—142 |
| 3,092,453 | 6/1963 | Gitzen | 23—142 |
| 3,388,993 | 6/1968 | Peterson et al. | 23—87 X |

OSCAR R. VERTIZ, Primary Examiner

G. T. OZAKI, Assistant Examiner